United States Patent [19]
Gale et al.

[11] Patent Number: 6,038,621
[45] Date of Patent: *Mar. 14, 2000

[54] DYNAMIC PERIPHERAL CONTROL OF I/O BUFFERS IN PERIPHERALS WITH MODULAR I/O

[75] Inventors: Thomas S. Gale; Patrick W. Fulghum, both of Boise, Id.; Kevin N. Smith, Fort Collins, Colo.; Steven J. Jahr, Granite Bay; James G. Wendt, Auburn, both of Calif.

[73] Assignee: Hewlett-Packard Company, Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/743,618

[22] Filed: Nov. 4, 1996

[51] Int. Cl.[7] .................................................. G06F 13/00
[52] U.S. Cl. .............................. 710/56; 710/52; 710/12; 710/13; 710/17; 710/18; 710/19; 709/212; 709/213
[58] Field of Search ..................................... 395/832–834, 395/836–839, 842, 843, 848, 872, 876, 877, 882–883, 309, 311, 250, 200.42–200.46; 711/147–148, 152–153

[56] References Cited

U.S. PATENT DOCUMENTS

| | | | |
|---|---|---|---|
| 4,378,588 | 3/1983 | Katzman | 710/129 |
| 4,591,973 | 5/1986 | Ferris, III et al. | 395/309 |
| 4,688,166 | 8/1987 | Schneider | 395/309 |
| 4,807,121 | 2/1989 | Halford | 395/309 |
| 4,839,791 | 6/1989 | Ito | 395/250 |
| 5,008,808 | 4/1991 | Fries et al. | 364/200 |
| 5,197,128 | 3/1993 | Campell et al. | 395/821 |
| 5,220,674 | 6/1993 | Morgan et al. | 395/800 |
| 5,412,781 | 5/1995 | Lukas et al. | 395/250 |
| 5,414,816 | 5/1995 | Oyadomari | 395/821 |
| 5,418,909 | 5/1995 | Jackowski et al. | 395/821 |
| 5,485,590 | 1/1996 | Hyatt et al. | 395/883 |
| 5,524,214 | 6/1996 | Kurihara | 395/250 |
| 5,640,604 | 6/1997 | Hirano | 395/876 |
| 5,687,392 | 11/1997 | Radko | 395/842 |
| 5,713,041 | 1/1998 | Chen et al. | 395/800.01 |
| 5,784,698 | 7/1998 | Brady et al. | 711/171 |
| 5,797,042 | 8/1998 | Gaylord | 710/56 |
| 5,838,994 | 11/1998 | Valizadeh | 710/56 |
| 5,907,717 | 5/1999 | Ellis | 710/56 |

OTHER PUBLICATIONS

European Search Report; dtd. Mar. 5, 1998 (3 pp.).

*Primary Examiner*—Ayaz R. Sheikh
*Assistant Examiner*—Raymond N Phan

[57] ABSTRACT

A peripheral system includes (a) a peripheral device having peripheral memory located thereon, (b) at least one input/output (I/O) card communicating with the peripheral device, and (c) a means for managing the peripheral memory between the peripheral device and the at least one I/O card. In a preferred embodiment, the means for managing the peripheral memory includes (a) a means for determining, during normal operation, an optimum amount of peripheral memory for allocating to each I/O card, and (b) a means for allocating, during normal operation, the optimum amount of peripheral memory to each I/O card. A preferred method for managing memory, between a peripheral device, having peripheral memory thereon, and at least one input/output (I/O) card, includes (a) determining, during normal operation, an optimum amount of peripheral memory for allocating to each I/O card, and (b) allocating, during normal operation, the optimum amount of peripheral memory to each I/O card.

21 Claims, 4 Drawing Sheets

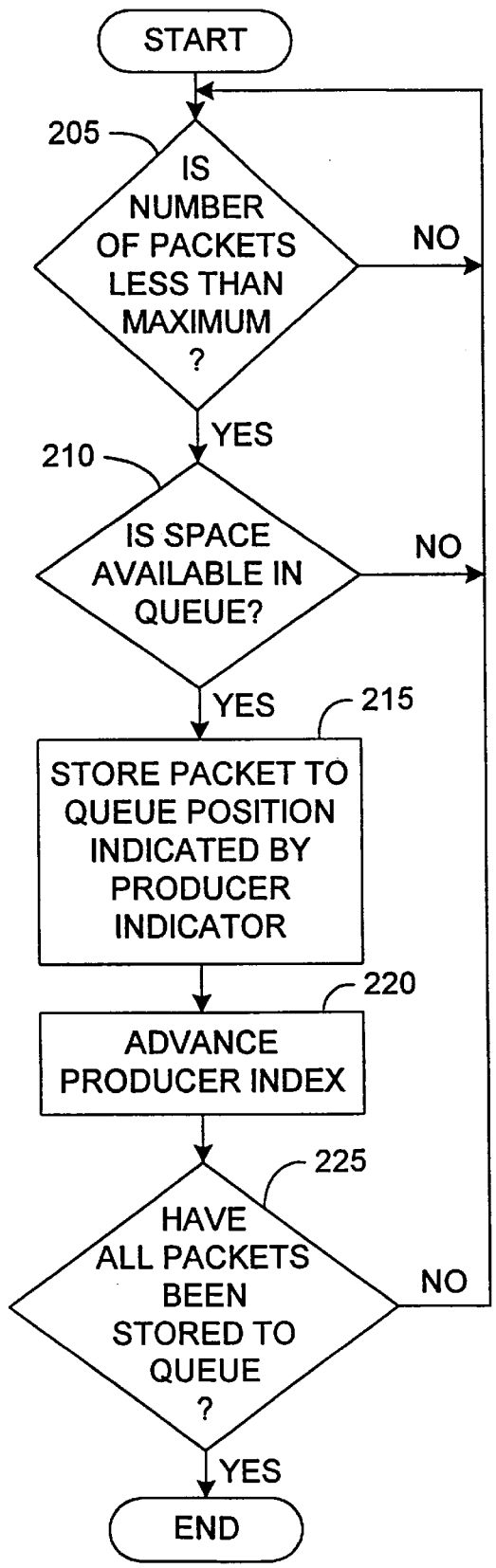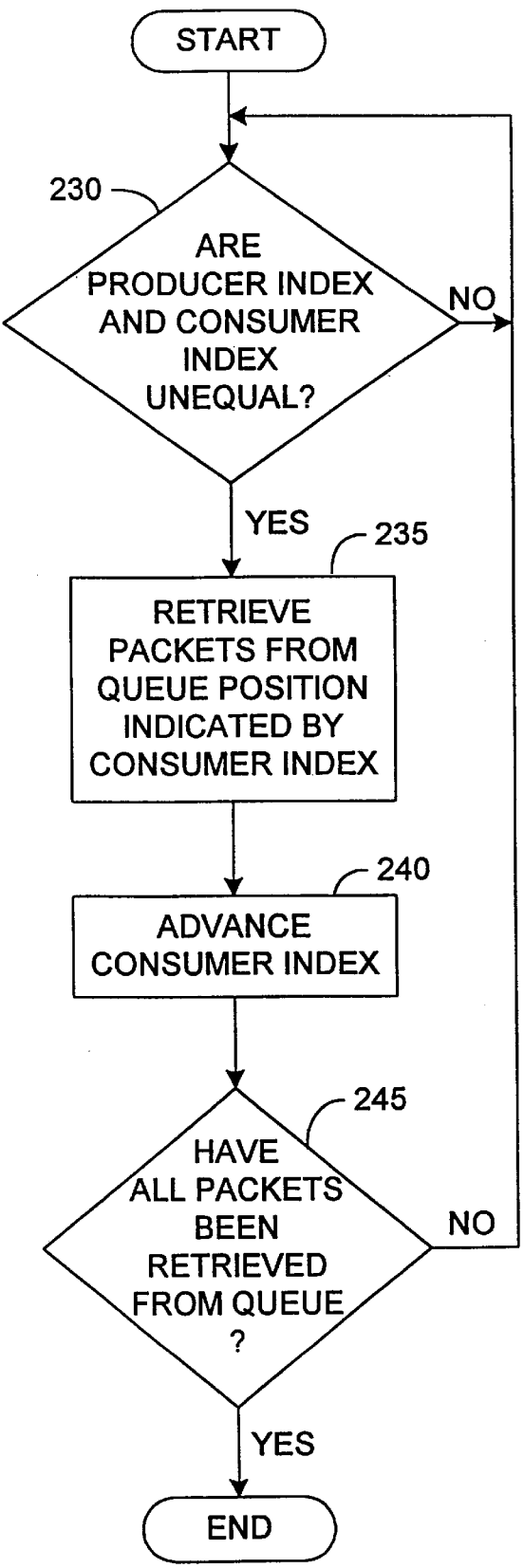
FIG. 4
FIG. 5

6,038,621

DYNAMIC PERIPHERAL CONTROL OF I/O BUFFERS IN PERIPHERALS WITH MODULAR I/O

FIELD OF THE INVENTION

This invention relates, in general, to peripheral device systems and, more specifically, to memory management by peripheral devices with respect to associated input/output cards.

BACKGROUND OF THE INVENTION

Many peripherals (i.e., printers and scanners) use the modular input/output (MIO) scheme where a modular input/output (I/O) card carries memory that is used to communicate with the peripheral. The memory, while residing on the I/O card, is also (at least in part) accessible to the processor (s) of the peripheral. This MIO scheme is described in Campbell et al., U.S. Pat. No. 5,197,128 and will be referred to as the conventional MIO protocol.

Since the memory resides on an individual I/O card in the conventional MIO protocol, the memory cannot be used by the peripheral to service another I/O card. Consequently, an I/O card's memory may wait unused while another I/O card operates at reduced efficiency for lack of memory.

In the conventional MIO protocol, the I/O card passes control of the memory to the peripheral during peripheral—I/O card initialization. The memory is logically broken up by the peripheral into smaller entities called buffers. The buffer size is based on a one time negotiation between the peripheral and the I/O card. The buffer size is fixed at initialization and may not be varied during normal operation. Since the buffer size is fixed, the peripheral must allocate a buffer to each I/O card which is at least large enough to serve the maximum data transfer which is likely to occur.

One prior art solution to the problem of fixed buffer size is to allocate a small buffer to the I/O card and copy data from I/O card memory into printer memory as necessary to free up I/O buffers. However, this solution takes processor time and bandwidth away from other operations, resulting in slower processing of other operations.

During operation, control (ownership) of the buffers moves back and forth between the peripheral and the I/O card. However, once the peripheral assigns buffers to an I/O channel of an I/O card, the peripheral cannot reclaim the buffer without an I/O card reset. Therefore, those buffers which were assigned to an I/O channel are essentially unavailable to other I/O channels that may be operating at reduced efficiency due to smaller buffer size. As a result, each I/O channel must be equipped with enough memory to serve anticipated I/O channel needs. This results in an unneeded duplication of costly memory and a reduced ability to increase memory by the addition of optional memory modules.

The conventional MIO protocol is adequate for peripherals with single I/O channels, but becomes strained under the increasing demands of peripherals with multiple I/O cards (or cards with multiple channels).

Accordingly, objects of the present invention are to provide a new system for managing memory between peripheral devices and I/O cards that overcomes the aforementioned limitations associated with conventional systems, that permits the peripheral devices to (1) allocate memory among I/O channels of the I/O card, based on the needs of each I/O channel; (2) allocate memory among the I/O cards based on the needs of each card; and (3) resize buffers during normal operation, without an I/O card reset.

SUMMARY OF THE INVENTION

According to principles of the present invention in a preferred embodiment, a system and method manage peripheral memory, located on a peripheral device, between the peripheral device and at least one input/output (I/O) card. Namely, the present invention comprises (a) a peripheral device having peripheral memory located thereon, (b) at least one I/O card communicating with the peripheral device, and (c) means for managing the peripheral memory between the peripheral device and the at least one I/O card. According to further principles in a preferred embodiment, the means for managing the peripheral memory includes (a) means for determining, during normal operation, an optimum amount of peripheral memory for allocating to each I/O card, and (b) means for allocating, during normal operation, the optimum amount of peripheral memory to each I/O card. Additionally in a preferred embodiment, an optimum amount of peripheral memory is determined for and allocated to each channel of each I/O card.

According to further principles of the present invention, a preferred method comprises (a) determining, during normal operation, an optimum amount of peripheral memory for allocating to each I/O card, and (b) allocating, during normal operation, the optimum amount of peripheral memory to each I/O card.

Other objects, advantages, and capabilities of the present invention will become more apparent as the description proceeds.

DESCRIPTION OF THE DRAWINGS

FIGS. 4 and 5 are flow charts showing a preferred embodiment of transferring data from the peripheral to the I/O card of FIG. 1 or from the I/O card to the peripheral.

DETAILED DESCRIPTION OF THE INVENTION

Figure 1:
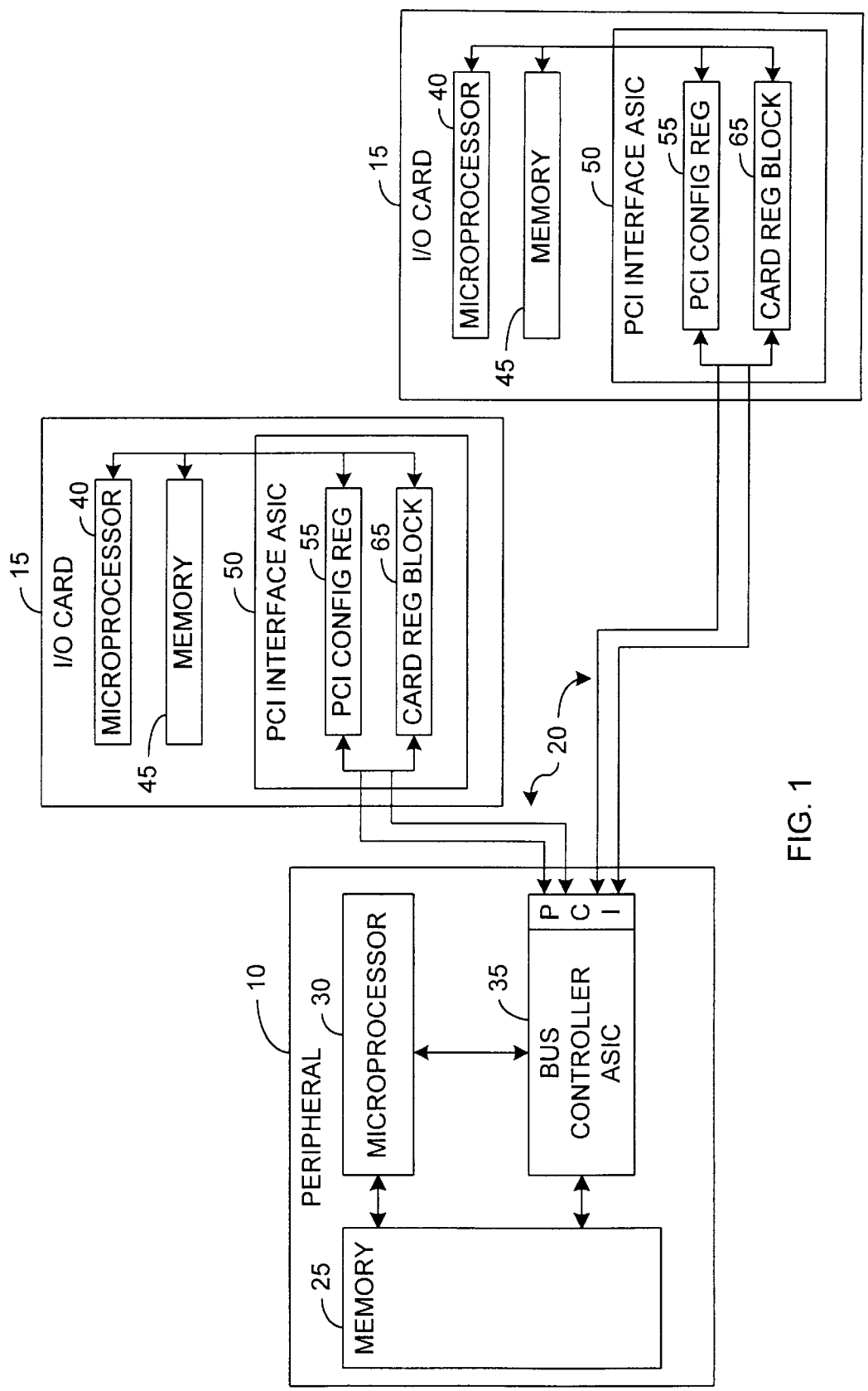
FIG. 1 is a block diagram of the present invention showing multiple input/output (I/O) cards attached to a peripheral device.

FIG. 1 is a block diagram showing peripheral device 10 communicating with multiple input/output (I/O) cards 15. Although only two I/O cards 15 are shown, any number of I/O cards 15 may be connected to peripheral 10. Each I/O card 15 is provided in an associated host computer (not shown). Each host computer has one or more I/O cards 15 located therein. For illustrative purposes, multiple channels 20 are shown as multiple lines. However, multiple channels 20 may be implemented on a single physical communications path between peripheral 10 and I/O cards 20. Typically peripheral 10 is a printer. Alternatively, peripheral 10 is a scanner or any other peripheral which may communicate with multiple I/O cards or multiple I/O channels.

Located on peripheral 10 are peripheral memory 25, peripheral microprocessor 30, and peripheral Bus Controller ASIC 35. Peripheral memory 25 is allocated among I/O cards 15 and channels 20 for use in communications between peripheral 10 and I/O cards 15. Located on I/O card 15 are card microprocessor 40, card memory 45, and PCI interface ASIC 50. PCI interface ASIC 50 communicates with Bus Controller ASIC 35. PCI interface ASIC 50 contains PCI configuration register 55 and card register block 65.

Figure 2:
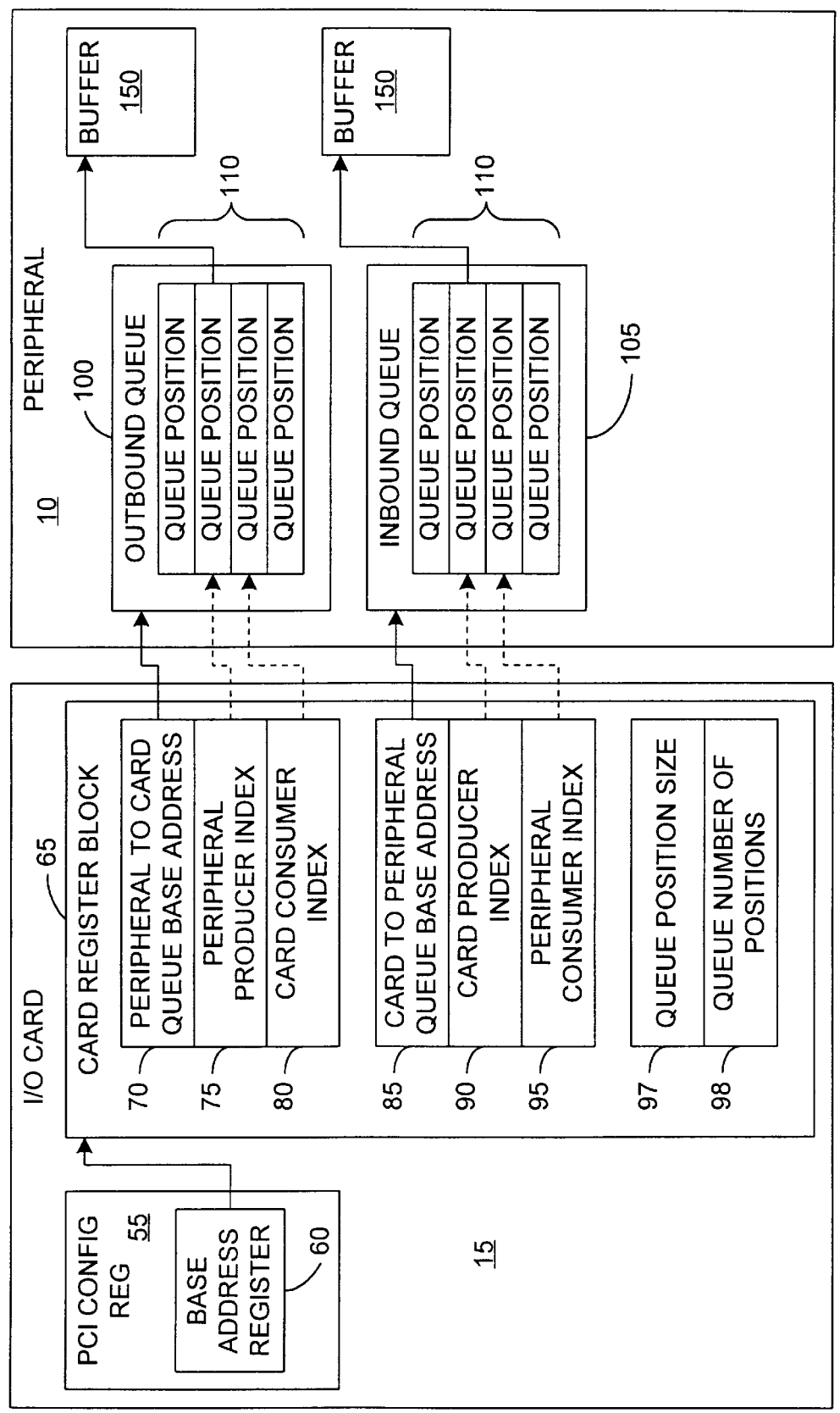
FIG. 2 is a block diagram showing the memory address locations for the peripheral and the I/O card of FIG. 1.

Referring now to FIG. 2, a block diagram is shown which depicts memory address locations in a preferred embodiment of the present invention. Within PCI configuration register 55 is a base address register 60. Base address register 60 contains the memory address of card register block 65. Card register block 65 contains the following registers: peripheral to card queue base address 70, peripheral producer index 75, card consumer index 80, card to peripheral queue base address 85, card producer index 90, peripheral consumer index 95, queue position size 97, and queue number of positions 98.

Peripheral to card queue base address register 70 and card to peripheral queue base address register 85 contain, respectively, the base addresses for the peripheral to card (outbound) queue 100 and the card to peripheral (inbound) queue 105. Inbound and outbound queues 100, 105 are located on peripheral 10. Each queue 100, 105 contains queue positions 110. Queue positions 110 contain packets of information.

Figure 3:
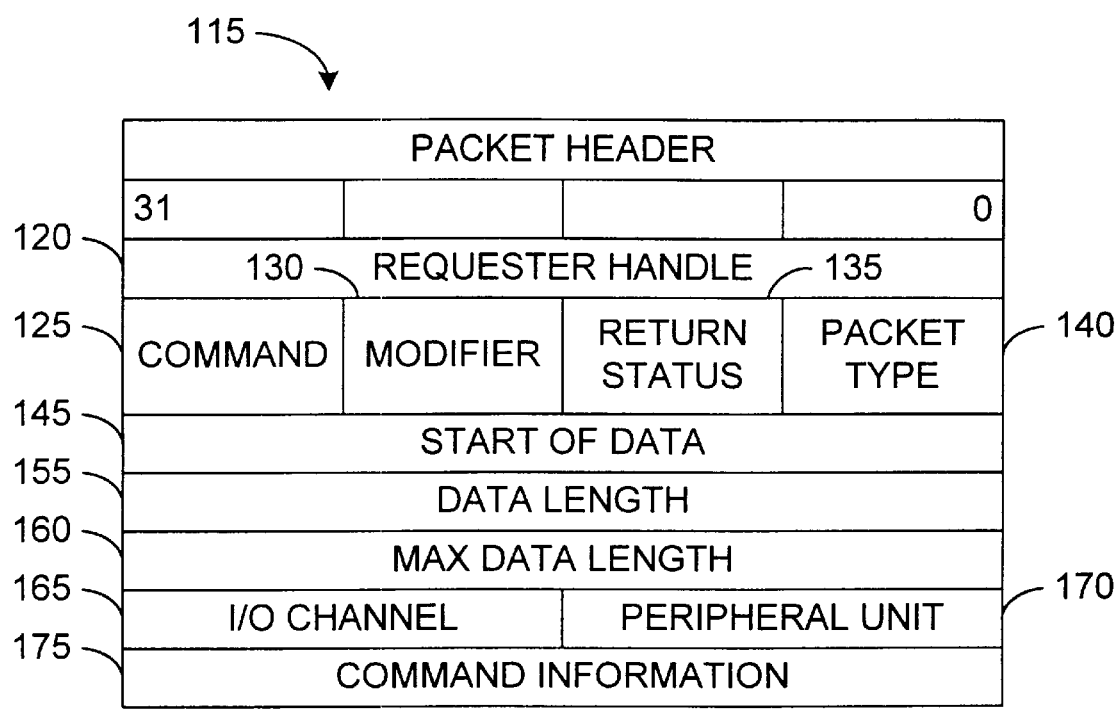
FIG. 3 is a diagram showing the field structure of a packet header.

Referring to FIG. 3, each packet contains a packet header 115. In a preferred embodiment of the present invention, each packet header 115 includes packet header fields 120–145 and 155–175. Requester handle packet header field 120 identifies a request made by peripheral 10. I/O card 15 will then send the contents of this field 120 with the response so that peripheral 10 will be able to match the response with the request.

Command packet header field 125 identifies the major action to be performed by I/O card 15. Modifier packet header field 130 identifies the minor action to be performed by I/O card 15. Return status packet header field 135 identifies the result of performing the action(s) specified by command field 125 and modifier field 130.

Packet type packet header field 140 indicates whether the packet is a type which has associated data or does not have associated data. Start of data packet header field 145 contains the address of the first byte of data in the buffer 150 (FIG. 2) associated with the packet header 115. This field 145 is controlled by peripheral 10 and cannot be modified by I/O card 15.

Data length packet header field 155 indicates the number of valid data bytes present in the buffer 150 associated with the packet header 115. Maximum data length packet header field 160 indicates a maximum number of bytes of data that may be placed into the buffer 150 associated with the packet header 115. This field 165 is controlled by peripheral 10 and cannot be modified by I/O card 15.

I/O channel packet header field 165 indicates the logical I/O channel relating to the packet transaction. This field 165 provides a means of addressing packet headers 115 to or from separate I/O cards 15. The means of addressing is referred to as the channel 20 (FIG. 1).

Peripheral unit packet header field 170 indicates the peripheral unit or service relating to the packet transaction. This field 170 provides a means of addressing packet headers 115 to or from separate end points of peripherals 10. Command information packet header field 175 contains auxiliary parameters in the packet header 115 for general request/response command usage. The end points of peripheral 10 are those portions of peripheral 10 which carry out separate functions. Examples of such functions in a printer include 1) printing data and 2) receiving control messages.

Referring again to FIG. 2, peripheral producer index 75 indicates the next queue position 110 to be filled in by the peripheral 10, but not yet filled in. Card consumer index 80 indicates the next queue position 110 to be retrieved by the card, but not yet retrieved. Similarly, card producer index 90 indicates the next queue position 110 to be filled in by the card 15, but not yet filled in. Also, peripheral consumer index 95 indicates the next queue position 110 to be retrieved by the peripheral, but not yet retrieved.

When there is no data in outbound queue 100 for card 15 to process, peripheral producer index 75 and card consumer index 80 are equal. Also, when there is no data in inbound queue 105 for peripheral 10 to process, card producer index 90 and peripheral consumer index 95 are equal. A queue 100 (105) is full when the producer index 75 (90) $\oplus$ one is equal to the consumer index 80 (95). The symbol $\oplus$ is used to indicate circular addition, which is defined to wrap around to the first queue position 110 when the last queue position 110 has been passed.

Allocating peripheral memory 25 to I/O cards 15 is accomplished by writing new values to start of data packet header field 145 and/or maximum data length packet header field 160. Since these fields 145, 160 are under the complete control of peripheral 10, changing the location and/or size of buffer 150 is accomplished without any action on the part of I/O cards 15. As a result, peripheral 10 may allocate and reallocate peripheral memory 25 during normal operation, without a protocol reset between peripheral 10 and I/O cards 15. Normal operation is defined in this context as any time after peripheral—I/O card initialization when the peripheral and the I/O card are communicating.

In a preferred embodiment, peripheral 10 initially allocates small buffers to each I/O card and to each channel 20 of each I/O card 15. As I/O cards 15 or channels 20 require more memory, peripheral 10 allocates peripheral memory 25 as required to provide the optimum amount of peripheral memory 25 to each I/O card 15 and each channel 20. As I/O card 15 or channels 20 requires less memory, I/O card 15 returns control of the peripheral memory 25 to peripheral 10. Optionally, peripheral 10 may reclaim the peripheral memory 25 from I/O card 15. Peripheral 10 reclaims peripheral memory 25 by requesting control of the peripheral memory 25 from I/O card 15. As control of the peripheral memory 25 is returned to peripheral 10, peripheral 10 reallocates the peripheral memory 25 to other I/O cards 15 or channels 20 in order to provide the optimum amount of memory to each I/O card 15 and each channel 20.

Peripheral 10 may determine how much peripheral memory 25 is the optimum amount based on any information which is available to peripheral 10. Typical examples of information which peripheral 10 may use include: peripheral memory available, I/O activity, print job status, print job size, print job priority, I/O transmission speed, utilization of previously passed buffers, I/O type, and print job data buffering.

FIGS. 4 and 5 are flow charts showing a preferred embodiment of how packets are transferred from peripheral 10 to card 15 or from card 15 to peripheral 10. Referring to FIG. 4, packets are transferred from peripheral 10 to card 15 in the following manner. Peripheral 10 first determines 205 if the number of outstanding packets is less than the maximum number of outstanding packets determined at initialization by I/O card 15. The maximum number of outstanding packets is the maximum number of packets that I/O card 15 can hold. If the number of outstanding packets is greater than the maximum number, peripheral 10 waits until I/O card 15 has processed some of the packets.

If the number of outstanding packets is less than or equal to the maximum number, peripheral 10 determines 210 if outbound queue 100 has space available. If no space is available in outbound queue 100, peripheral 10 waits until outbound queue 100 has space available. If outbound queue 100 has space available, peripheral 10 begins to store 215 the packets in outbound queue 100 at the position 110 indicated by peripheral producer index 75. After the current queue position 110 has been filled, peripheral producer index 75 is advanced 220 to the next position 110. If packets remain to be stored 225, peripheral 10 again determines 210 if space is available in outbound queue 100, and if so, begins to store 215 packets in the next position 110 indicated by peripheral producer index 75. This process continues until outbound queue 100 is full 210 or the packets have all been stored 225 to outbound queue 100. If outbound queue 100 is full 210, peripheral 10 waits until space is available 210 in outbound queue 100 before storing 215 additional packets to outbound queue 100.

Referring now to FIG. 5, when card 15 recognizes 230 that peripheral producer index 75 and card consumer index 80 are unequal, card 15 begins to retrieve 235 packets from outbound queue 100 at the position 110 indicated by card consumer index 80. After card 15 has finished retrieving packets from queue position 110, card consumer index 80 is advanced 240. If packets remain to be retrieved, card 15 begins to retrieve packets from the next queue position 110 indicated by card consumer index 80. This process continues until all packets have been retrieved 245 from outbound queue 100, which occurs when peripheral producer index 75 and card consumer index 80 are equal once again.

Referring again to FIG. 4, packets are transferred from card 15 to peripheral 10 in a manner similar to the process described for transferring packets from peripheral 10 to card 15, except that step 205 is omitted. I/O card 15 determines 210 if inbound queue 105 has space available. If no space is available in inbound queue 105, card 15 waits until inbound queue 105 has space available. If inbound queue 105 has space available, card 15 begins to store 215 the packets in inbound queue 105 at the position 110 indicated by card producer index 90. After the current queue position 110 has been filled, card producer index 90 is advanced 220 to the next position 110. If packets remain to be stored 225, card 15 again determines 210 if space is available in inbound queue 105, and if so, begins to store 215 packets in the next position 110 indicated by card producer index 90. This process continues until inbound queue 105 is full 210 or the packets have all been stored 225 to inbound queue 105. If inbound queue 105 is full 210, card 15 waits until space is available 210 in inbound queue 105 before storing 215 additional packets to inbound queue 105. This process continues until all packets have been retrieved 245 from inbound queue 105, which occurs when card producer index 90 and peripheral consumer index 95 are equal once again.

Referring again to FIG. 5, when peripheral 10 recognizes 230 that card producer index 90 and peripheral consumer index 95 are unequal, peripheral 10 begins to retrieve 235 packets from inbound queue 105 at the position 110 indicated by peripheral consumer index 95. After peripheral 10 has finished retrieving packets from queue position 110, peripheral consumer index 95 is advanced 240. If packets remain to be retrieved, peripheral 10 begins to retrieve packets from the next queue position 110 indicated by peripheral consumer index 95.

If peripheral 10 has data to send to I/O card 15, peripheral 10 stores a packet to queue position 110 in outbound queue 100 informing I/O card 15 that there is data for I/O card 15 to retrieve. The start of data packet header field 145, the data length packet header field 155, and the maximum data length packet header field 160 define a buffer 150 where I/O card 15 will find the data. I/O card 15 will then retrieve the packet from queue position 110 in outbound queue 100. I/O card 15 then copies the data from the buffer 150 indicated by the packet header fields 145, 155, 160.

Peripheral 10 requests data from I/O card 15 by storing a packet to queue position 110 in outbound queue 110 requesting data from I/O card 15. The start of data packet header field 145, and the maximum data length packet header field 1 60 define a buffer 150 where peripheral 10 will store the data. I/O card 15 then stores data to buffer 150 and copies a packet to queue position 110 in inbound queue 105 informing peripheral 10 that there is data for peripheral 10 to retrieve. The packet will contain the same values for fields 145 and 160 as the packet requesting the data. Data length packet header field 155 will be modified by I/O card 15 to indicate the actual length of the data stored to buffer 150. Peripheral 10 will then retrieve the packet from queue position 110 in outbound queue 100. Peripheral 10 then copies the data from the buffer 150 indicated by the packet header fields 145, 155, 160.

The present invention has the novel advantage of allowing peripheral device 10 to allocate buffers between I/O cards 15 and between channels 20, depending on the needs of the individual I/O cards 15 and their respective channels 20. A further advantage is that peripheral device 10 may dynamically size the buffers during normal operation, without a protocol reset between I/O cards 15 and peripheral 10.

In summary, what has been described above are the preferred embodiments for a system and method of managing memory between a peripheral device and at least one I/O card. While the present invention has been described by reference to specific embodiments, it will be obvious that other alternative embodiments and methods of implementation or modification may be employed without departing from the true spirit and scope of the invention.

What is claimed is:

1. A peripheral system comprising:
   (a) a peripheral device having peripheral memory located thereon;
   (b) at least one input/output (I/O) card having at least one channel and communicating with the peripheral device;
   (c) means for allocating the peripheral memory between the peripheral device, the at least one I/O card, and each channel of the at least one I/O card;
   (d) first peripheral means for reclaiming from the at least one I/O card, during normal operation, control of an amount of peripheral memory allocated to the at least one I/O card; and,
   (e) second peripheral means for reclaiming from the at least one channel, during normal operation, control of an amount of peripheral memory allocated to the at least one channel.

2. The peripheral system of claim 1 further including:
   (a) first means for determining, during normal operation, an optimum amount of peripheral memory for allocating to each I/O card; and,
   (b) second means for determining, during normal operation, an optimum amount of peripheral memory for allocating to each channel.

3. A peripheral system comprising:
   (a) a peripheral device having peripheral memory located thereon;
   (b) at least one input/output (I/O) card communicating with the peripheral device; and,
   (c) means for managing the peripheral memory between the peripheral device and the at least one I/O card, the means for managing the peripheral memory including:

(i) means for determining, during normal operation, an optimum amount of peripheral memory for allocating to each I/O card, the means for determining including means for considering, selectively, an amount of I/O activity, a print job status, a print job size, a print job priority, an I/O transmission speed, and an I/O type;

(ii) means for allocating, during normal operation, the optimum amount of peripheral memory to each I/O card; and (iii) peripheral means for reclaiming from the at least one I/O card, during normal operation, control of the amount of peripheral memory allocated to the at least one I/O card.

4. A peripheral system comprising:

(a) a peripheral device having peripheral memory located thereon, (b) at least one input/output (I/O) card having at least one channel and communicating with the peripheral device; and, (c) means for managing the peripheral memory between the peripheral device and the at least one I/O card, the means for managing the peripheral memory including:

(i) first means for determining, during normal operation, a first optimum amount of peripheral memory for allocating to each I/O card, the means for determining including means for considering, selectively, an amount of I/O activity, a print job status, a print job size, a print job priority, an I/O transmission speed, and an I/O type;

(ii) second means for determining, during normal operation, a second optimum amount of peripheral memory for allocating to each channel;

(iii) first means for allocating, during normal operation, the first optimum amount of peripheral memory to each I/O card; and (iv) second means for allocating, during normal operation, the second optimum amount of peripheral memory to each channel.

5. A system for managing memory between a peripheral device, having peripheral memory thereon, and at least one input/output (I/O) card having at least one channel, the system comprising:

(a) first means for determining, during normal operation, a first optimum amount of peripheral memory for allocating to each I/O card;

(b) second means for determining, during normal operation, a second optimum amount of peripheral memory for allocating to each channel;

(c) first means for allocating, during normal operation, the first optimum amount of peripheral memory to each I/O card;

(d) second means for allocating, during normal operation, the second optimum amount of peripheral memory to each channel; and, wherein the first and second means for determining each include a means for considering, selectively, an amount of I/O activity, a print job status, a print job size, a print job priority, an I/O transmission speed, and an I/O type.

6. A method for managing memory between a peripheral device, having peripheral memory thereon, and at least one input/output (I/O) card having at least one channel, the method comprising:

(a) determining, during normal operation, a first optimum amount of peripheral memory for allocating to each I/O card;

(b) determining, during normal operation, a second optimum amount of peripheral memory for allocating to each channel;

(c) allocating, during normal operation, the first optimum amount of peripheral memory to each I/O card; and, (d) allocating, during normal operation, the second optimum amount of peripheral memory to each channel; and, wherein the first and second optimum amounts of peripheral memory are determined from, selectively, an amount of I/O activity, a print job status, a print job size, a print job priority, an I/O transmission speed, and an I/O type.

7. A peripheral system comprising:

(a) a peripheral device having peripheral memory located thereon;

(b) at least one input/output (I/O) card communicating with the peripheral device, the at least one I/O card having at least one channel;

(c) means for allocating the peripheral memory between the peripheral device, the at least one I/O card, and each channel of each I/O card;

(d) first I/O card means for returning to the peripheral device, during normal operation, control of an amount of peripheral memory allocated to the at least one I/O card; and, (e) second I/O card means for returning to the peripheral device, during normal operation, control of an amount of peripheral memory allocated to the at least one channel.

8. The peripheral system of claim 7 further including:

(a) first means for determining, during normal operation, an optimum amount of peripheral memory for allocating to each I/O card; and, (b) second means for determining, during normal operation, an optimum amount of peripheral memory for allocating to each channel.

9. A peripheral system comprising:

(a) a peripheral device having peripheral memory located thereon;

(b) at least one input/output (I/O) card communicating with the peripheral device; and, (c) means for managing the peripheral memory between the peripheral device and the at least one I/O card, the means for managing the peripheral memory including:

(i) means for determining, during normal operation, an optimum amount of peripheral memory for allocating to each I/O card, the means for determining including means for considering, selectively, an amount of I/O activity, a print job status, a print job size, a print job priority, an I/O transmission speed, and an I/O type;

(ii) means for allocating, during normal operation, the optimum amount of peripheral memory to each I/O card; and (iii) I/O card means for returning to the peripheral device, during normal operation, control of the amount of peripheral memory allocated to the at least one I/O card.

10. A peripheral system comprising:

(a) a peripheral device having peripheral memory located thereon;

(b) at least one input/output (I/O) card having at least one channel and communicating with the peripheral device; and, (c) means for managing the peripheral memory between the peripheral device, the at least one I/O card, and each channel of the at least one I/O card, the means for managing the peripheral memory including:
  (i) first means for determining, during normal operation, a first optimum amount of peripheral memory for allocating to each I/O card;
  (ii) second means for determining, during normal operation, a second optimum amount of peripheral memory for allocating to each channel;
  (iii) first means for allocating, during normal operation, the first optimum amount of peripheral memory to each I/O card; and
  (iv) second means for allocating, during normal operation, the second optimum amount of peripheral memory to each channel.

11. The peripheral system of claim 10 wherein the first and the second means for allocating each include:
  (a) means for writing a packet to a queue position, each packet including:
    (i) a start of data packet header field containing a first value indicating an address in the peripheral memory of a buffer and,
    (ii) a maximum data length packet header field containing a second value indicating a size of the buffer; and,
  (b) peripheral means for selectively changing the first value and the second value.

12. The peripheral system of claim 10 wherein the means for managing the peripheral memory further includes peripheral means for reclaiming from the at least one I/O card, during normal operation, control of an amount of peripheral memory allocated to the at least one I/O card.

13. The peripheral system of claim 10 wherein the means for managing the peripheral memory further includes I/O card means for returning to the peripheral device, during normal operation, control of an amount of peripheral memory allocated to the at least one I/O card.

14. A system for managing memory between a peripheral device, having peripheral memory thereon, and at least one input/output (I/O) card having at least one channel, the system comprising:
  (a) first means for determining, during normal operation, a first optimum amount of peripheral memory for allocating to each I/O card;
  (b) second means for determining, during normal operation, a second optimum amount of peripheral memory for allocating to each channel;
  (c) first means for allocating, during normal operation, the first optimum amount of peripheral memory to each I/O card; and,
  (d) second means for allocating, during normal operation, the second optimum amount of peripheral memory to each channel.

15. The system of claim 14 wherein the first and second means for allocating each include:
  (a) means for writing a packet to a queue position, each packet including:
    (i) a start of data packet header field containing a first value indicating an address in the peripheral memory of a buffer and,
    (ii) a maximum data length packet header field containing a second value indicating a size of the buffer; and,
  (b) peripheral means for selectively changing the first value and the second value.

16. The system of claim 14 further including peripheral means for reclaiming from the at least one I/O card, during normal operation, control of the first amount of peripheral memory allocated to the at least one I/O card.

17. The system of claim 14 further including I/O card means for returning to the peripheral device, during normal operation, control of the first amount of peripheral memory allocated to the at least one I/O card.

18. A method for managing memory between a peripheral device, having peripheral memory thereon, and at least one input/output (I/O) card having at least one channel, the method comprising:
  (a) determining, during normal operation, a first optimum amount of peripheral memory for allocating to each I/O card;
  (b) determining, during normal operation, a second optimum amount of peripheral memory for allocating to each channel;
  (c) allocating, during normal operation, the first optimum amount of peripheral memory to each I/O card; and,
  (d) allocating, during normal operation, the second optimum amount of peripheral memory to each channel.

19. The method of claim 18 wherein allocating the first and second optimum amounts of peripheral memory includes:
  (a) writing a packet to a queue position, each packet including:
    (i) a start of data packet header field containing a first value indicating an address in the peripheral memory of a buffer and,
    (ii) a maximum data length packet header field containing a second value indicating a size of the buffer; and,
  (b) the peripheral device selectively changing the first value and the second value.

20. The method of claim 18 further including the peripheral device reclaiming from the at least one I/O card, during normal operation, control of the first amount of peripheral memory allocated to the at least one I/O card.

21. The method of claim 18 further including the I/O card returning to the peripheral device, during normal operation, control of the first amount of peripheral memory allocated to the at least one I/O card.

* * * * *